US012184525B2

(12) United States Patent
Nowak et al.

(10) Patent No.: US 12,184,525 B2
(45) Date of Patent: *Dec. 31, 2024

(54) METHODS AND SYSTEMS FOR DETERMINING SEVERITY OF DISRUPTIONS IN COMMUNICATION NETWORKS IN NON-HOMOGENOUS ENVIRONMENTS

(71) Applicant: Capital One Services, LLC, McLean, VA (US)

(72) Inventors: Matthew Louis Nowak, Midlothian, VA (US); Michael Anthony Young, Jr., Henrico, VA (US); Christopher McDaniel, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,548

(22) Filed: Oct. 18, 2023

(65) Prior Publication Data

US 2024/0048467 A1 Feb. 8, 2024

Related U.S. Application Data

(63) Continuation of application No. 17/504,377, filed on Oct. 18, 2021, now Pat. No. 11,831,531.

(51) Int. Cl.
*H04L 67/10* (2022.01)
*G06F 40/205* (2020.01)
*G06N 20/20* (2019.01)
*H04L 43/0876* (2022.01)
*H04L 43/16* (2022.01)

(52) U.S. Cl.
CPC ........ *H04L 43/0876* (2013.01); *G06F 40/205* (2020.01); *G06N 20/20* (2019.01); *H04L 43/16* (2013.01); *H04L 67/10* (2013.01)

(58) Field of Classification Search
CPC ...... G06F 40/205; G06N 20/00; G06N 20/20; H04L 41/064; H04L 41/0681; H04L 41/142; H04L 41/16; H04L 41/22; H04L 43/0876; H04L 43/16; H04L 67/10
USPC ....................................... 370/329
See application file for complete search history.

(56) References Cited

U.S. PATENT DOCUMENTS

| 9,392,471 | B1* | 7/2016 | Thomas | H04L 41/147 |
| 11,641,592 | B1* | 5/2023 | Duraibabu | G10L 15/22 |
| | | | | 704/270.1 |
| 11,677,643 | B2* | 6/2023 | Johnson | H04L 43/16 |
| | | | | 370/253 |
| 2007/0036309 | A1* | 2/2007 | Zoldi | H04M 15/58 |
| | | | | 379/112.01 |
| 2010/0031156 | A1* | 2/2010 | Doyle | H04L 41/147 |
| | | | | 715/736 |

(Continued)

*Primary Examiner* — Robert J Lopata
(74) *Attorney, Agent, or Firm* — Foley & Lardner LLP

(57) ABSTRACT

Methods and systems that use a plurality of machine learning models to both monitor user-generated data entries corresponding to differences in network traffic that may be evidence of a disruption and determine severity levels based on: (i) current and historic differences in average network traffic over the plurality of communication networks; (ii) current and historic user-generated data entries; and (iii) labeled severity levels for historic differences in average network traffic over the plurality of communication networks.

20 Claims, 4 Drawing Sheets

(56) References Cited

U.S. PATENT DOCUMENTS

| | | | |
|---|---|---|---|
| 2014/0269291 A1* | 9/2014 | Dwivedi | H04W 28/0289 |
| | | | 370/232 |
| 2016/0050132 A1* | 2/2016 | Zhang | H04L 43/20 |
| | | | 370/252 |
| 2016/0218933 A1* | 7/2016 | Porras | H04L 41/147 |
| 2017/0054648 A1* | 2/2017 | Ngo-Tan | H04L 65/752 |
| 2017/0134287 A1* | 5/2017 | Shaw | H04L 69/40 |
| 2019/0068512 A1* | 2/2019 | Papaloukopoulos | |
| | | | H04L 41/145 |
| 2020/0021482 A1* | 1/2020 | Lo | H04L 41/0631 |
| 2020/0092181 A1* | 3/2020 | Thiagarajan | H04L 45/121 |
| 2020/0136975 A1* | 4/2020 | Arora | H04L 41/145 |
| 2020/0328950 A1* | 10/2020 | Sharma | H04L 41/16 |
| 2020/0412660 A1* | 12/2020 | Ji | H04L 47/31 |
| 2022/0029902 A1* | 1/2022 | Shemer | H04L 41/0686 |
| 2023/0014795 A1* | 1/2023 | Khan | H04L 41/16 |

* cited by examiner

METHODS AND SYSTEMS FOR DETERMINING SEVERITY OF DISRUPTIONS IN COMMUNICATION NETWORKS IN NON-HOMOGENOUS ENVIRONMENTS

CROSS-REFERENCE TO RELATED APPLICATION(S)

This application is a continuation of U.S. patent application Ser. No. 17/504,377, filed Oct. 18, 2021. The content of the foregoing application is incorporated herein in its entirety by reference.

BACKGROUND

As the world increasingly moves toward the use of electronic communications as the predominant communication method, communication networks continue to expand. These networks may comprise computer networks, public switched telephone networks, packet switched networks, radio networks, and/or other forms of telecommunication networks. In addition to the type of network and/or the equipment facilitating that network, the architecture of the network may also vary. For example, network architectures may be based on a wheel network, chain network, circle network, all-channel network, etc. Accordingly, disruptions to any of these networks (e.g., caused by power loss, equipment failure, etc.) at a node in the network may have different effects on the overall network as each network has unique equipment, communication types, architectures, and functions (or functions provided). To further exacerbate this issue, many communication networks may feature a mixture of equipment, communication types, architectures, or functions. These communication networks may also comprise combinations of multiple different underlying communication networks, each with its own characteristics, thus creating communication networks that function in non-homogenous environments.

SUMMARY

Communication networks present in, and/or used across, non-homogenous environments create unique challenges in determining, and responding to, the severity of disruptions within the communication network. For example, all other characteristics being equal, the loss of a server in a chain communication network (e.g., where communications are passed from one server to another without an alternate route) may present a much more severe disruption that the loss of a server in an all-channel communication network (e.g., where communications may be passed from any server to any other server) as all network traffic may be halted in the former case and only some network traffic may be halted in the latter. In such an example, both the determination of the severity of the disruption due to the loss of the same server as well as the response is dependent on additional factors (e.g., the architecture and the location of the server within that architecture).

Continuing with this example, even detecting the full severity of the disruption may be difficult if the aforementioned server works in parallel with another server. In such a case, the loss of one server may not create a failure in the system but instead creates a slowdown (e.g., the remaining server must compensate for the downed server). Detection of this disruption may not be apparent as the slowdown may be interpreted as normal variations in network traffic. Even if the disruption is detected, the response to this disruption may vary based on the technical challenges (e.g., availability of workarounds to the server, availability to bring the server back online), geographic challenges (e.g., where the server is located), and/or access challenges (e.g., who has access to the server, what entity has the privileges/rights to address the server). Additional technical hurdles are compounded onto these challenges as communication networks increasingly rely on cloud-computing, microservices, and remote-access systems. In such cases, addressing even slight disruptions may involve coordination between multiple users, systems, and/or entities, each of which may use different terminology to describe the cause of disruptions, the effects of disruptions, and/or the severity of disruptions.

Accordingly, methods and systems are described herein for determining severity of disruptions in communication networks. In particular, the methods and systems use a plurality of machine learning models to both monitor user-generated data entries corresponding to differences in network traffic that may be evidence of a disruption and determine severity levels based on: (i) current and historic differences in average network traffic over the plurality of communication networks; (ii) current and historic user-generated data entries; and (iii) labeled severity levels for historic differences in average network traffic over the plurality of communication networks. In doing so, the system overcomes several technical hurdles.

For example, in order to overcome the technical hurdle in detecting disruptions, the system may monitor communication networks for differences in network traffic. To do so, the system may store data on both current and historic network traffic. Notably, this data may be archived according to predetermined time intervals, which may correspond to current and historic time periods. The system may then monitor for differences in network traffic (e.g., variations beyond predetermined thresholds that may be specific to a given communication network) to identify a given disruption. As this identification is based on differences (as opposed to absolute amounts) between current and historic network traffic during predetermined time intervals, and the differences may be compared to predetermined thresholds that may be specific to a given communication network, the differences do not need to be normalized across different communication networks.

In another example, in order to overcome the technical hurdle that users, systems, and/or entities express the severity of a disruption with different terminology (e.g., different error codes, words, expressions, etc.), the system uses a first machine learning model that comprises a natural language processing model that parses text strings (e.g., in data files created during a time interval corresponding to a disruption) describing differences in network traffic. The use of the first machine learning model allows the system to analyze the numerous user-generated data entries (e.g., text strings describing the disruption through error codes, words, expressions, etc.) that may be found in equally numerous data files (e.g., reports, documents, e-mails, messages, etc.) created during a time interval corresponding to a detected disruption in network traffic. Beyond simply matching text strings, the use of a natural language processing algorithm interprets the text strings for context and similarities. Based on the contexts and similarities, the first machine learning model may create common descriptions and/or ontologies to describe the disparities even across non-homogenous environments. These common descriptions and/or ontologies allow for different users, systems, and/or entities to refer to and cross-reference descriptions of disruptions (e.g., in a centralized database) in a normalized manner.

In yet another example, in order to overcome the technical hurdle in detecting disruptions, the system uses a second machine learning model, wherein the second machine learning model is trained to determine severity levels based on: (i) current and historic differences in average network traffic over a plurality of communication networks; (ii) current and historic user-generated data entries; and (iii) labeled severity levels for historic differences in average network traffic over the plurality of communication networks. The use of the second machine learning model allows the system to compare the magnitude of detected disruptions in relation to historic levels, compare how the detected disruptions are described in user-generated data entries in relation to historic descriptions, and compare previously assigned severity level determinations. Based on these comparisons, the system is able to provide normalized recommendations of severity levels of a given disruption, irrespective of the communication network or environment, in real-time.

In some aspects, methods and systems are disclosed for determining severity levels of disruptions in communication networks in non-homogenous environments using machine learning models. For example, the system may determine a difference in average network traffic over a first communication network of a plurality of communication networks during a first time interval. The system may determine, using a first machine learning model, a user-generated data entry corresponding to the difference, wherein the first machine learning model comprises a natural language processing model. The system may determine, using a second machine learning model, a severity level from a plurality of severity levels based on the user-generated data entry and the difference, wherein the second machine learning model is trained to determine severity levels based on: (i) current and historic differences in average network traffic over the plurality of communication networks; (ii) current and historic user-generated data entries; and (iii) labeled severity levels for historic differences in average network traffic over the plurality of communication networks. The system may generate for display, on a user interface, a recommendation based on the severity level.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
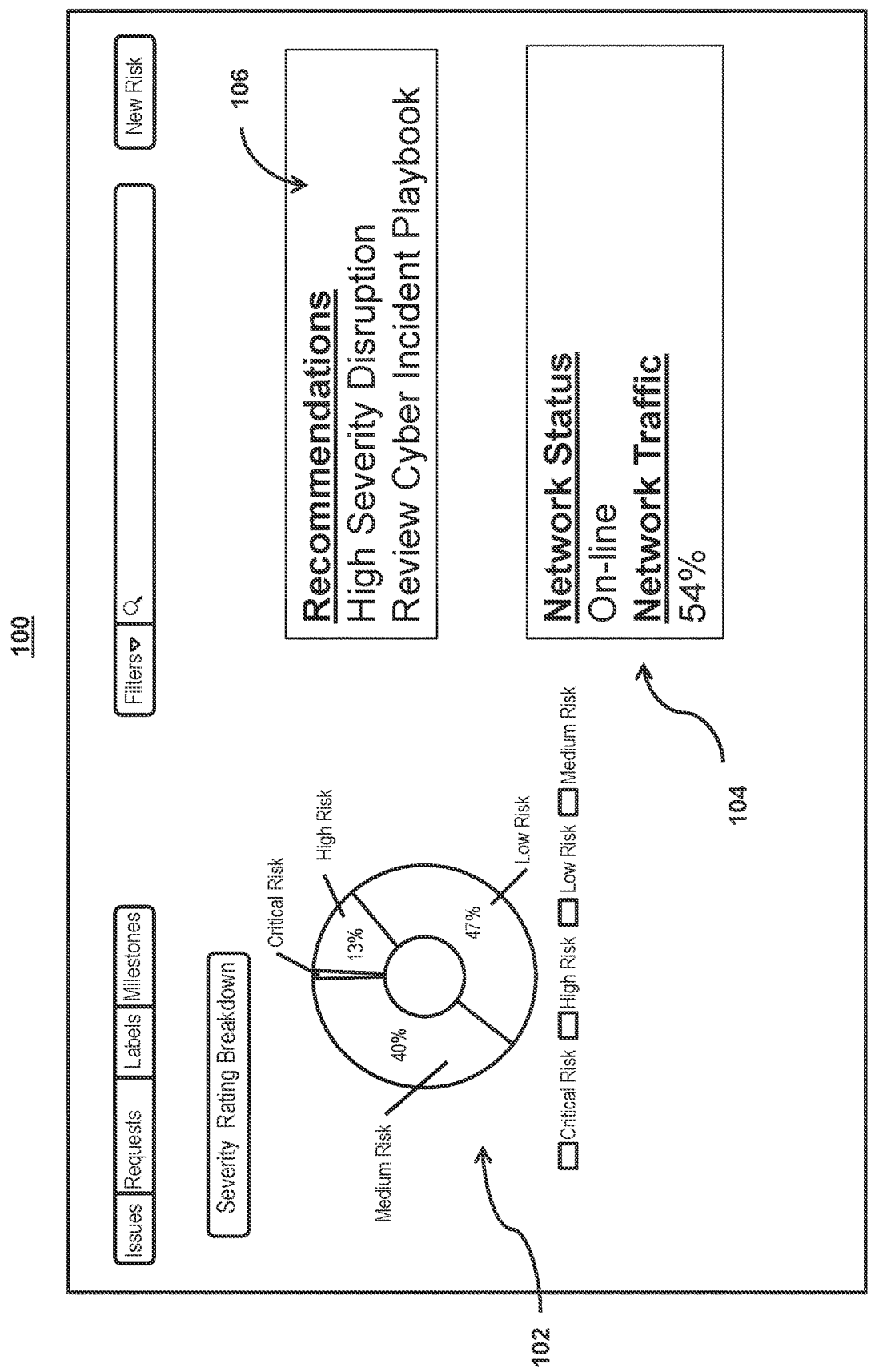
FIG. 1 shows an illustrative user interface for providing severity level recommendations for disruptions in communication networks in non-homogenous environments using machine learning models, in accordance with one or more embodiments.

FIG. 1 shows an illustrative user interface for providing severity level recommendations for disruptions in communication networks in non-homogenous environments using machine learning models, in accordance with one or more embodiments. For example, the system may generate user interface 100 in response to determining severity levels of disruptions in communication networks in non-homogenous environments using a plurality of machine learning models.

As referred to herein, "a severity level" may refer to a quantitative or qualitative assessment of a disruption in a communication network. The severity level may be represented in a recommendation several ways as shown in FIG. 1. For example, the system may provide a graphical representation of the severity level (e.g., recommendation 102). Additionally or alternatively, the system may provide a textual representation of the severity level (e.g., recommendation 106). The system may also present additional information to supplement the recommendation such as information about the origin, a difference in network traffic or other network characteristic that triggered the disruption, a responsible user or entity, and/or network components that are affected.

As referred to herein, a "disruption" may be any disturbance or problem, which interrupts an event, activity, or process of the communication network. The disruption may be detected based on a change or variation in normal network characteristics (e.g., network traffic, processing times, etc.). To detect the change or variation, the system may detect a difference between a value of a current network characteristic and a historic and/or average network characteristic. The system may continuously or periodically monitor one or more network conditions for the difference. For example, the system may compare a network characteristic to a predetermined network characteristic for a difference of a predetermined value. For example, the system may determine a difference in average network traffic over a first communication network of a plurality of communication networks during a first time interval. For example, the system may detect network outages, but also other kinds of software issues that can cause disruptions to service or to an entity's reputation. For example, if an entity provides marketing mailing campaigns that direct users to a website, but the mailer has a typo and is directing users to a non-existent website, this may be designated as a disruption. Or conversely, if the mailer is correct, but the latest version of the website did not contain the site the mailer directs to, the system may designate this as a disruption. Disruptions may also include instances where websites are not functioning correctly, for example approving or denying credit card purchases erroneously.

Also, if it makes the invention stronger, instead of a recommendation the outcome can be the automatic assignment of a severity.

To detect the disruption, the system may use one or more machine learning models. It should be noted that as referred to herein the one or more machine learning models may additionally or alternatively include other artificial intelligence components such as neural networks. Based on the machine learning models, the system may generate for display, on a user interface, a recommendation based on the severity level.

For example, the system solves the technical problem of generating recommendations for the severity level of network disruptions in non-homogenous environments. The solution to this technical problem may be provided, in some embodiments, by two machine learning models: a first model to generate a common nomenclature for disruptions, and a second for identifying the severity based on the nomenclature. Solving this technical problem provides the practical benefit of quickly expressing the severity to a plurality of different users, each of which may have a different background and/or technological understanding.

Figure 2:
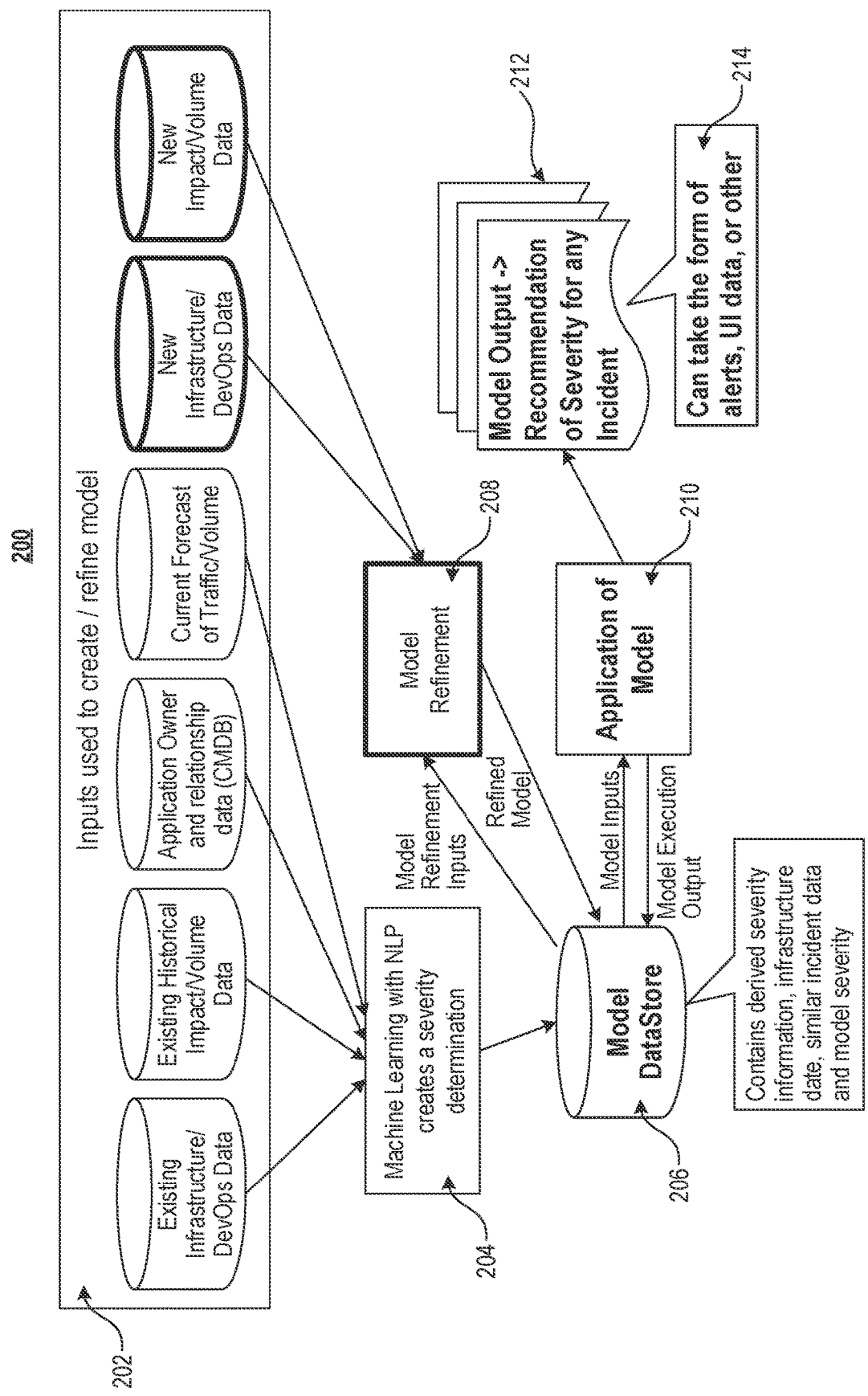
FIG. 2 shows an illustrative architecture for determining severity levels of disruptions in communication networks, in accordance with one or more embodiments.

FIG. 2 shows an illustrative architecture for determining severity levels of disruptions in communication networks, in accordance with one or more embodiments. For example, system 200 may be used to generate the recommendations described in FIG. 1.

System 200 may include data input 202. For example, data inputs 202 may include data on existing infrastructure (e.g., network characteristics and/or conditions), historical data (e.g., historical values for average network conditions), application ownership information, and current/forecast data (e.g., current or forecasted values for network conditions and/or characteristics). Data inputs 202 may also include new data sources on additions and/or modifications to the communications network. For example, system 200 may allow scaling of the system through the addition of additional data and/or data sources.

Data inputs 202 may be input into machine learning model 204. For example, machine learning model 204 may comprise a first machine learning model, wherein the first machine learning model comprises a natural language processing model that parses text strings describing differences in network traffic. For example, machine learning model 204 may combine computational linguistics—rule-based modeling of human language—with statistical, machine learning, and deep learning models. The system may process human language in the form of text or voice data and to "understand" its full meaning, complete with the speaker or writer's intent and sentiment.

For example, machine learning model 204 may include speech tagging to determine the part of speech of a particular word or piece of text based on its use and context, and may include word sense disambiguation to determine the meaning of a word with multiple meanings through a process of semantic analysis that determines the word that makes the most sense in the given context. Machine learning model 204 may also include named entity recognition to identify words or phrases as useful entities.

Data from machine learning model 204 may be input into data store 206. Data store 206 may include prior severity determinations, which may be used as labels for training machine learning models. For example, model 210 may comprise a second machine learning model, wherein the second machine learning model is trained to determine severity levels based on: (i) current and historic differences in average network traffic over a plurality of communication networks; (ii) current and historic user-generated data entries; and (iii) labeled severity levels for historic differences in average network traffic over the plurality of communication networks. Data store 206 may also receive model refinements 208, which may include additional parameters, weights, and/or hyperparameters. Model 210 may generate output 212, which may then be used to generate recommendation 214.

Figure 3:
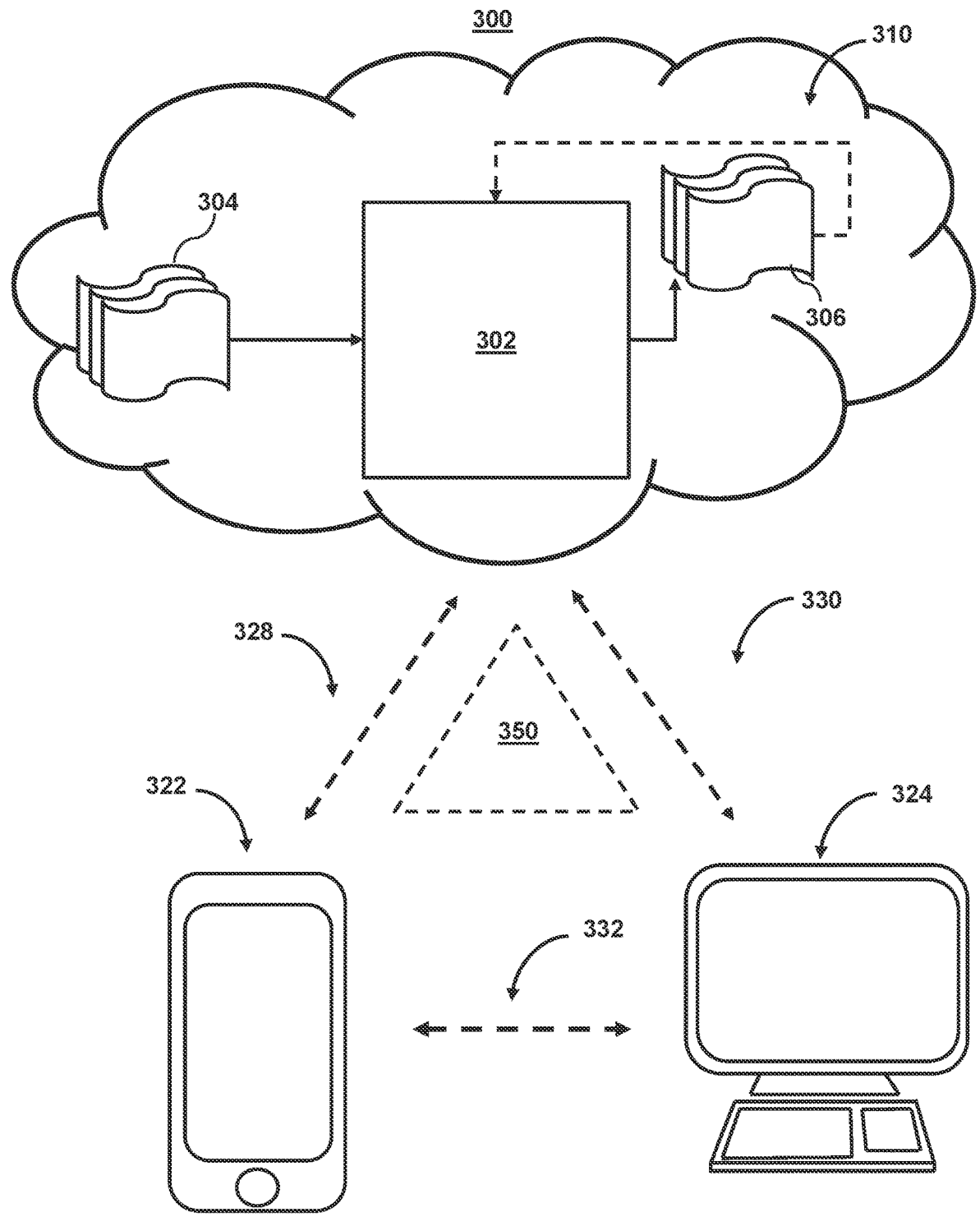
FIG. 3 shows illustrative system components for determining severity levels of disruptions in communication networks, in accordance with one or more embodiments.

FIG. 3 shows illustrative system components for determining severity levels of disruptions in communication networks, in accordance with one or more embodiments. For example, the system may represent the components used for generating dynamic conversational responses, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted severities, and/or actual severities. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user-generated data entry, word, severity level, etc.).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation based on the severity level.

System 300 also includes API layer 350. API layer 350 may allow the system to generate recommendations across different devices. In some embodiments, API layer 350 may be implemented on user device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside; in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use developer portal. API layer 350 may use strong security constraints applying WAF and DDoS protection, and API layer 350 may use RESTful APIs as standard for external integration.

Figure 4:
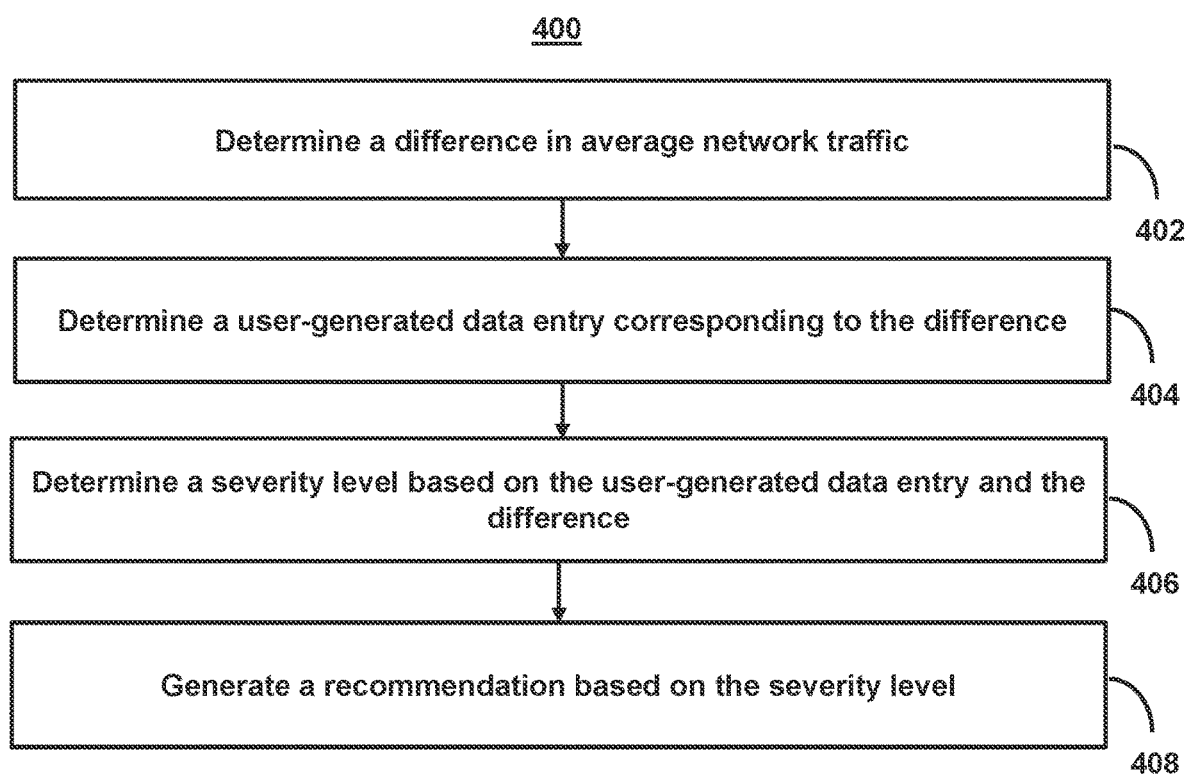
FIG. 4 shows a flowchart of the steps involved in determining severity levels of disruptions in communication networks, in accordance with one or more embodiments.

FIG. 4 shows a flowchart of the steps involved in determining severity levels of disruptions in communication networks in non-homogenous environments using machine learning models. For example, the system may use process 400 (e.g., as implemented on one or more system components as described in FIGS. 1-3) in order to generate recommendations for severity levels.

At step 402, process 400 (e.g., using one or more components described in system 300 (FIG. 3)) determines a difference in average network traffic. For example, the system may determine a difference in average network traffic over a first communication network of a plurality of communication networks during a first time interval (e.g., each of the plurality of communication networks corresponds to a respective environment of a plurality of non-homogenous environments).

In some embodiments, the system may determine the difference in average network traffic over the first communication network of the plurality of communication networks during the first time interval by monitoring network traffic and comparing it to historical averages. For example, the system may determine a first amount of network traffic over the first communication network during a first current time period corresponding to the first time interval. The system may then determine a first average amount of network traffic over the first communication network during a first plurality of historic time periods corresponding to the first time interval. The system may then determine the difference based on comparing the first amount to the first average amount.

At step 404, process 400 (e.g., using one or more components described in system 300 (FIG. 3)) determines a user-generated data entry corresponding to the difference. For example, the system may determine, using a first machine learning model, a user-generated data entry corresponding to the difference, wherein the first machine learning model comprises a natural language processing model (e.g., that parses text strings describing differences in network traffic). For example, the system may retrieve a data file created by a user at a date corresponding to the first time interval. The system may then parse the data file for a plurality of text strings. The system may then apply the natural language processing model to the plurality of text strings to determine user-generated data entries corresponding to the difference. For example, the system may pull a user's email or a system file and determine what word a user used to describe the disruption or what error code was triggered by the disruption.

In some embodiments, the determination of the difference may be triggered by a detected event. For example, the system may compare the difference to a threshold difference (e.g., the threshold difference may equal one standard deviation of the average network traffic). In response to determining that the difference equals or exceeds the threshold difference, the system may retrieve a data file created by a user at a date corresponding to the first time interval.

At step 406, process 400 (e.g., using one or more components described in system 300 (FIG. 3)) determines a severity level based on the user-generated data entry and the difference. For example, the system may determine, using a second machine learning model, a severity level from a plurality of severity levels based on the user-generated data entry and the difference, wherein the second machine learning model is trained to determine severity levels based on: (i) current and historic differences in average network traffic over the plurality of communication networks; (ii) current and historic user-generated data entries; and (iii) labeled severity levels for historic differences in average network traffic over the plurality of communication networks.

The system (and/or the second machine learning model) may additionally or alternatively use a variety of information to determine the severity level. In some embodiments, the system may compare the user-generated data entry to a plurality of labeled user-generated data entries, wherein each labeled user-generated data entry of the plurality of labeled user-generated data entries corresponds to a respective severity level of the plurality of severity levels. The system may then retrieve, based on comparing the user-generated data entry to the plurality of labeled user-generated data entries, the respective severity level for a labeled user-generated data entry that corresponds to the user-generated data entry. For example, the system may determine a severity level based on what word a user used to describe a disruption. For example, the system may assign different severity levels to the word "bad" versus the word "horrible," or to the word "failure" versus the words "critical failure." In another example, the system may assign different severity levels to different error codes.

Additionally or alternatively, the system may determine a frequency of the user-generated data entry in data files corresponding to the first time interval. The system may compare the frequency to a plurality of labeled frequencies, wherein each labeled frequency of the plurality of labeled frequencies corresponds to a respective severity level of the plurality of severity levels. The system may then retrieve, based on comparing the frequency to the plurality of labeled frequencies, the respective severity level for a labeled frequency that corresponds to the frequency. For example, the system may determine a severity based on how often users used a particular word in an email or the frequency at which an error code appeared in system files. For example, if a user describes the disruption as "bad" just once, the description may be an exaggeration. In contrast, if the user said the disruption was "bad" many times, the description is less likely to be an exaggeration and more likely to be an actual opinion.

Additionally or alternatively, the system may determine a number of instances of the user-generated data entry in data files created at a date corresponding to the first time interval. The system may compare the number of instances to a plurality of labeled number of instances, wherein each labeled number of instances of the plurality of labeled number of instances corresponds to a respective severity level of the plurality of severity levels. The system may retrieve, based on comparing the number of instances to the plurality of labeled number of instances, the respective severity level for a labeled number of instances that corresponds to the number of instances. For example, the system may determine how many times different users referred to a disruption using that same description. For example, if a single email describes the disruption as "bad," the description may be an exaggeration. In contrast, if multiple emails said the disruption was "bad," the description is less likely to be an exaggeration and more likely to be accurate.

Additionally or alternatively, the system may determine a number of different users that created data files containing the user-generated data entry at a date corresponding to the first time interval. The system may compare the number of different users to a plurality of labeled number of different users, wherein each labeled number of different users of the plurality of labeled number of different users corresponds to a respective severity level of the plurality of severity levels. The system may retrieve, based on comparing the number of different users to the plurality of labeled number of different users, the respective severity level for a labeled number of different users that corresponds to the number of different users. For example, if a single user describes the disruption as "bad," the description may be an exaggeration. In contrast, if multiple users said the disruption was "bad," the description is less likely to be an exaggeration and more likely to be an informed description as more information comes out about the disruption.

In some embodiments, the system may process one or more of the determined information (e.g., frequency, number of different users, etc.) into a feature input. For example, the system may generate a feature input based on the user-generated data entry and the difference. The system may input the feature input into the second machine learning model. The system may then receive an output from the second machine learning model.

At step 408, process 400 (e.g., using one or more components described in system 300 (FIG. 3)) generates a recommendation based on the severity level. For example, the system may generate for display, on a user interface, a recommendation based on the severity level (e.g., wherein the recommendation comprises a description of a disruption corresponding to the difference that is normalized across different communication).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for determining severity levels of disruptions in communication networks in non-homogenous environments using machine learning models, the method comprising: determining a difference in average network traffic over a first communication network of a plurality of communication networks during a first time interval; determining, using a first machine learning model, a user-generated data entry corresponding to the difference, wherein the first machine learning model comprises a natural language processing model; determining, using a second machine learning model, a severity level from a plurality of severity levels based on the user-generated data entry and the difference, wherein the second machine learning model is trained to determine severity levels based on: (i) current and historic differences in average network traffic over the plurality of communication networks; (ii) current and historic user-generated data entries; and (iii) labeled severity levels for historic differences in average network traffic over the plurality of communication networks; and generating for display, on a user interface, a recommendation based on the severity level.

2. The method of any one of the preceding embodiments, wherein determining the difference in average network traffic over the first communication network of the plurality of communication networks during the first time interval comprises: determining a first amount of network traffic over the first communication network during a first current time period corresponding to the first time interval; determining a first average amount of network traffic over the first communication network during a first plurality of historic time periods corresponding to the first time interval; and determining the difference based on comparing the first amount to the first average amount.

3. The method of any one of the preceding embodiments, wherein determining the user-generated data entry corresponding to the difference based on the first machine learning model comprises: retrieving a data file created by a user at a date corresponding to the first time interval; parsing the data file for a plurality of text strings; applying the natural language processing model to the plurality of text strings to determine user-generated data entries corresponding to the difference.

4. The method of any one of the preceding embodiments, wherein determining the severity level from the plurality of severity levels based on the user-generated data entry comprises: comparing the user-generated data entry to a plurality of labeled user-generated data entries, wherein each labeled user-generated data entry of the plurality of labeled user-generated data entries corresponds to a respective severity level of the plurality of severity levels; and retrieving, based on comparing the user-generated data entry to the plurality of labeled user-generated data entries, the respective severity level for a labeled user-generated data entry that corresponds to the user-generated data entry.

5. The method of any one of the preceding embodiments, wherein determining the severity level from the plurality of severity levels based on the user-generated data entry comprises: determining a frequency of the user-generated data entry in data files corresponding to the first time interval; comparing the frequency to a plurality of labeled frequencies, wherein each labeled frequency of the plurality of labeled frequencies corresponds to a respective severity level of the plurality of severity levels; and retrieving, based on comparing the frequency to the plurality of labeled frequencies, the respective severity level for a labeled frequency that corresponds to the frequency.

6. The method of any one of the preceding embodiments, wherein determining the severity level from the plurality of severity levels based on the user-generated data entry comprises: determining a number of instances of the user-generated data entry in data files created at a date corresponding to the first time interval; comparing the number of instances to a plurality of labeled number of instances, wherein each labeled number of instances of the plurality of labeled number of instances corresponds to a respective severity level of the plurality of severity levels; and retrieving, based on comparing the number of instances to the plurality of labeled number of instances, the respective severity level for a labeled number of instances that corresponds to the number of instances.

7. The method of any one of the preceding embodiments, wherein determining the severity level from the plurality of severity levels based on the user-generated data entry comprises: determining a number of data files containing the user-generated data entry created at a date corresponding to the first time interval; comparing the number of data files to a plurality of labeled number of data files, wherein each labeled number of data files of the plurality of labeled number of data files corresponds to a respective severity level of the plurality of severity levels; and retrieving, based on comparing the number of data files to the plurality of labeled number of data files, the respective severity level for a labeled number of data files that corresponds to the number of data files.

8. The method of any one of the preceding embodiments, wherein determining the severity level from the plurality of severity levels based on the user-generated data entry comprises: determining a number of different users that created data files containing the user-generated data entry at a date corresponding to the first time interval; comparing the number of different users to a plurality of labeled number of different users, wherein each labeled number of different users of the plurality of labeled number of different users corresponds to a respective severity level of the plurality of severity levels; and retrieving, based on comparing the number of different users to the plurality of labeled number of different users, the respective severity level for a labeled number of different users that corresponds to the number of different users.

9. The method of any one of the preceding embodiments, further comprising: comparing the difference to a threshold difference; and in response to determining that the difference equals or exceeds the threshold difference, retrieving a data file created by a user at a date corresponding to the first time interval.

10. The method of any one of the preceding embodiments, wherein using the second machine learning model comprises: generating a feature input based on the user-generated data entry and the difference; inputting the feature input into the second machine learning model; and receiving an output from the second machine learning model.

11. A tangible, non-transitory, machine-readable medium storing instructions that, when executed by a data processing apparatus, causes the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for determining severity levels of disruptions in communication networks in non-homogenous environments using models, the system comprising:
   cloud-based storage circuitry configured to store:
      a first model, wherein the first model comprises a natural language processing model that parses text strings describing differences in network characteristics; and
      a second model, wherein the second model is trained to determine severity levels based on: network characteristics (i) current and historic user-generated data entries; and (ii) labeled severity levels for historic differences in average network characteristics over a plurality of communication networks;
   cloud-based control circuitry configured to:
      determine, using the first model, a user-generated data entry corresponding to a difference in average network characteristics over a first communication network of a plurality of communication networks;
generate a feature input based on the user-generated data entry and the difference;
input the feature input into the second model;
receive an output from the second model;
determine, using the second model, a severity level from a plurality of severity levels based on the user-generated data entry and the difference; and
cloud-based input/output circuitry configured to generate for display, on a user interface, a recommendation based on the severity level, wherein the recommendation comprises a description of a disruption corresponding to the difference that is normalized across different communication networks.

2. A method for determining severity levels of disruptions in communication networks in non-homogenous environments using models, the method comprising:
determining a difference in average network characteristics over a first communication network of a plurality of communication networks;
determining, using a first model, a user-generated data entry corresponding to the difference, wherein the first model comprises a natural language processing model;
determining, using a second model, a severity level from a plurality of severity levels based on the user-generated data entry and the difference, wherein the second model is trained to determine severity levels based on: network characteristics (i) current and historic user-generated data entries; and (ii) labeled severity levels for historic differences in average network characteristics over the plurality of communication networks; and
generating for display, on a user interface, a recommendation based on the severity level.

3. The method of claim 2, wherein determining the difference in average network characteristics over the first communication network of the plurality of communication networks comprises:
determining a first amount of network characteristics over the first communication network during a first current time period;
determining a first average amount of network characteristics over the first communication network during a first plurality of historic time periods; and
determining the difference based on comparing the first amount to the first average amount.

4. The method of claim 2, wherein determining the user-generated data entry corresponding to the difference comprises:
retrieving a data file created by a user at a date;
parsing the data file for a plurality of text strings; and
applying the natural language processing model to the plurality of text strings to determine user-generated data entries corresponding to the difference.

5. The method of claim 2, wherein determining the severity level from the plurality of severity levels based on the user-generated data entry comprises:
comparing the user-generated data entry to a plurality of labeled user-generated data entries, wherein each labeled user-generated data entry of the plurality of labeled user-generated data entries corresponds to a respective severity level of the plurality of severity levels; and
retrieving, based on comparing the user-generated data entry to the plurality of labeled user-generated data entries, the respective severity level for a labeled user-generated data entry that corresponds to the user-generated data entry.

6. The method of claim 2, wherein determining the severity level from the plurality of severity levels based on the user-generated data entry comprises:
determining a frequency of the user-generated data entry in data files;
comparing the frequency to a plurality of labeled frequencies, wherein each labeled frequency of the plurality of labeled frequencies corresponds to a respective severity level of the plurality of severity levels; and
retrieving, based on comparing the frequency to the plurality of labeled frequencies, the respective severity level for a labeled frequency that corresponds to the frequency.

7. The method of claim 2, wherein determining the severity level from the plurality of severity levels based on the user-generated data entry comprises:
determining a number of instances of the user-generated data entry in data files created at a date;
comparing the number of instances to a plurality of labeled number of instances, wherein each labeled number of instances of the plurality of labeled number of instances corresponds to a respective severity level of the plurality of severity levels; and
retrieving, based on comparing the number of instances to the plurality of labeled number of instances, the respective severity level for a labeled number of instances that corresponds to the number of instances.

8. The method of claim 2, wherein determining the severity level from the plurality of severity levels based on the user-generated data entry comprises:
determining a number of data files containing the user-generated data entry created at a date;
comparing the number of data files to a plurality of labeled number of data files, wherein each labeled number of data files of the plurality of labeled number of data files corresponds to a respective severity level of the plurality of severity levels; and
retrieving, based on comparing the number of data files to the plurality of labeled number of data files, the respective severity level for a labeled number of data files that corresponds to the number of data files.

9. The method of claim 2, wherein determining the severity level from the plurality of severity levels based on the user-generated data entry comprises:
determining a number of different users that created data files containing the user-generated data entry at a date;
comparing the number of different users to a plurality of labeled number of different users, wherein each labeled number of different users of the plurality of labeled number of different users corresponds to a respective severity level of the plurality of severity levels; and
retrieving, based on comparing the number of different users to the plurality of labeled number of different users, the respective severity level for a labeled number of different users that corresponds to the number of different users.

10. The method of claim 2, further comprising:
comparing the difference to a threshold difference; and
in response to determining that the difference equals or exceeds the threshold difference, retrieving a data file created by a user at a date.

11. The method of claim 2, wherein using the second model comprises:

generating a feature input based on the user-generated data entry and the difference;
inputting the feature input into the second model; and
receiving an output from the second model.

12. A non-transitory, computer-readable medium for determining severity levels of disruptions in communication networks in non-homogenous environments using models, comprising instructions that when executed by one or more processors, causes operations comprising:
determining a difference in average network characteristics over a first communication network of a plurality of communication networks during a first time interval;
determining, using a first model, a user-generated data entry corresponding to the difference, wherein the first model comprises a natural language processing model;
determining, using a second model, a severity level from a plurality of severity levels based on the user-generated data entry and the difference, wherein the second model is trained to determine severity levels based on user-generated data entries and labeled severity levels for historic differences in average network characteristics over the plurality of communication networks; and
generating for display a recommendation based on the severity level.

13. The non-transitory, computer-readable medium of claim 12, wherein determining the difference in average network characteristics over the first communication network of the plurality of communication networks during the first time interval comprises:
determining a first amount of network characteristics over the first communication network during a first current time period;
determining a first average amount of network characteristics over the first communication network during a first plurality of historic time periods; and
determining the difference based on comparing the first amount to the first average amount.

14. The non-transitory, computer-readable medium of claim 12, wherein determining the user-generated data entry corresponding to the difference comprises:
retrieving a data file created by a user at a date;
parsing the data file for a plurality of text strings; and
applying the natural language processing model to the plurality of text strings to determine user-generated data entries corresponding to the difference.

15. The non-transitory, computer-readable medium of claim 12, wherein determining the severity level from the plurality of severity levels based on the user-generated data entry comprises:
comparing the user-generated data entry to a plurality of labeled user-generated data entries, wherein each labeled user-generated data entry of the plurality of labeled user-generated data entries corresponds to a respective severity level of the plurality of severity levels; and
retrieving, based on comparing the user-generated data entry to the plurality of labeled user-generated data entries, the respective severity level for a labeled user-generated data entry that corresponds to the user-generated data entry.

16. The non-transitory, computer-readable medium of claim 12, wherein determining the severity level from the plurality of severity levels based on the user-generated data entry comprises:
determining a frequency of the user-generated data entry in data files;
comparing the frequency to a plurality of labeled frequencies, wherein each labeled frequency of the plurality of labeled frequencies corresponds to a respective severity level of the plurality of severity levels; and
retrieving, based on comparing the frequency to the plurality of labeled frequencies, the respective severity level for a labeled frequency that corresponds to the frequency.

17. The non-transitory, computer-readable medium of claim 12, wherein determining the severity level from the plurality of severity levels based on the user-generated data entry comprises:
determining a number of instances of the user-generated data entry in data files created at a date;
comparing the number of instances to a plurality of labeled number of instances, wherein each labeled number of instances of the plurality of labeled number of instances corresponds to a respective severity level of the plurality of severity levels; and
retrieving, based on comparing the number of instances to the plurality of labeled number of instances, the respective severity level for a labeled number of instances that corresponds to the number of instances.

18. The non-transitory, computer-readable medium of claim 12, wherein determining the severity level from the plurality of severity levels based on the user-generated data entry comprises:
determining a number of data files containing the user-generated data entry created at a date;
comparing the number of data files to a plurality of labeled number of data files, wherein each labeled number of data files of the plurality of labeled number of data files corresponds to a respective severity level of the plurality of severity levels; and
retrieving, based on comparing the number of data files to the plurality of labeled number of data files, the respective severity level for a labeled number of data files that corresponds to the number of data files.

19. The non-transitory, computer-readable medium of claim 12, wherein determining the severity level from the plurality of severity levels based on the user-generated data entry comprises:
determining a number of different users that created data files containing the user-generated data entry at a date;
comparing the number of different users to a plurality of labeled number of different users, wherein each labeled number of different users of the plurality of labeled number of different users corresponds to a respective severity level of the plurality of severity levels; and
retrieving, based on comparing the number of different users to the plurality of labeled number of different users, the respective severity level for a labeled number of different users that corresponds to the number of different users.

20. The non-transitory, computer-readable medium of claim 12, wherein the instructions cause further operations comprising:
comparing the difference to a threshold difference; and
in response to determining that the difference equals or exceeds the threshold difference, retrieving a data file created by a user at a date.

* * * * *